(12) United States Patent
Sato et al.

(10) Patent No.: US 12,512,286 B2
(45) Date of Patent: Dec. 30, 2025

(54) RELAY DEVICE AND POWER SUPPLY DEVICE FOR VEHICLE

(71) Applicant: SUBARU CORPORATION, Tokyo (JP)

(72) Inventors: Tomoya Sato, Tokyo (JP); Makoto Sumiyoshi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 65 days.

(21) Appl. No.: 18/367,769

(22) Filed: Sep. 13, 2023

(65) Prior Publication Data

US 2024/0105408 A1    Mar. 28, 2024

(30) Foreign Application Priority Data

Sep. 22, 2022   (JP) ................................. 2022-151210

(51) Int. Cl.
| | | |
|---|---|---|
| *H01H 50/04* | (2006.01) | |
| *B60R 16/03* | (2006.01) | |
| *H01H 50/12* | (2006.01) | |
| *H01H 85/20* | (2006.01) | |

(52) U.S. Cl.
CPC ........... *H01H 50/045* (2013.01); *B60R 16/03* (2013.01); *H01H 50/12* (2013.01); *H01H 2085/208* (2013.01)

(58) Field of Classification Search
None
See application file for complete search history.

(56) References Cited

U.S. PATENT DOCUMENTS

| | | | | |
|---|---|---|---|---|
| 10,971,873 | B2* | 4/2021 | Rai | ......................... H01H 50/12 |
| 2017/0076877 | A1* | 3/2017 | Pal | ........................... H01H 1/62 |
| 2017/0295672 | A1* | 10/2017 | Pal | ......................... B64D 41/00 |
| 2018/0366922 | A1* | 12/2018 | Pal | ........................... H01H 9/52 |
| 2021/0112680 | A1* | 4/2021 | Rai | .................... H05K 7/20254 |

FOREIGN PATENT DOCUMENTS

JP    2018-125159 A    8/2018

* cited by examiner

*Primary Examiner* — Bernard Rojas
(74) *Attorney, Agent, or Firm* — MCGINN I.P. LAW GROUP, PLLC

(57) ABSTRACT

A relay device includes a first contact, a second contact, a first conductor, a second conductor, a housing, and a heat transfer member. The first contact and the second contact are switchable between a state of being close to each other and a state of being separated from each other. The first contact is electrically coupled at the first conductor. the second contact is electrically coupled at the second conductor. The housing accommodates the first contact, the second contact, the first conductor, and the second conductor. The heat transfer member is higher in thermal conductivity than the housing. The heat transfer member extends from outside the housing to inside the housing and is in contact with one or both of the first conductor and the second conductor.

20 Claims, 2 Drawing Sheets

RELAY DEVICE AND POWER SUPPLY DEVICE FOR VEHICLE

CROSS-REFERENCE TO RELATED APPLICATIONS

The present application claims priority from Japanese Patent Application No. 2022-151210 filed on Sep. 22, 2022, the entire contents of which are hereby incorporated by reference.

BACKGROUND

The disclosure relates to a relay device and a power supply device of a vehicle.

Avoidance of freezing on a contact in a relay device is demanded. Japanese Unexamined Patent Application Publication No. 2018-125159 discloses an electromagnetic relay including a thermally conductive material for transmitting heat generated from an electromagnetic coil to a fixed contact.

SUMMARY

An aspect of the disclosure provides a relay device includes a first contact, a second contact, a first conductor, a second conductor, a housing, and a heat transfer member. The first contact and the second contact are switchable between a state of being close to each other and a state of being separated from each other. The first contact is electrically coupled at the first conductor. the second contact is electrically coupled at the second conductor. The housing accommodates the first contact, the second contact, the first conductor, and the second conductor. The heat transfer member is higher in thermal conductivity than the housing. The heat transfer member extends from outside the housing to inside the housing and is in contact with one or both of the first conductor and the second conductor.

An aspect of the disclosure provides a power supply device for a vehicle. The vehicle includes a power source configured to generate power to drive the vehicle and a power source chamber in which the power source is disposed. The power supply device includes an electric power line and the above-described relay device. The relay device is configured to open and close an electric path of the electric power line. The relay device is disposed in the power source chamber.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
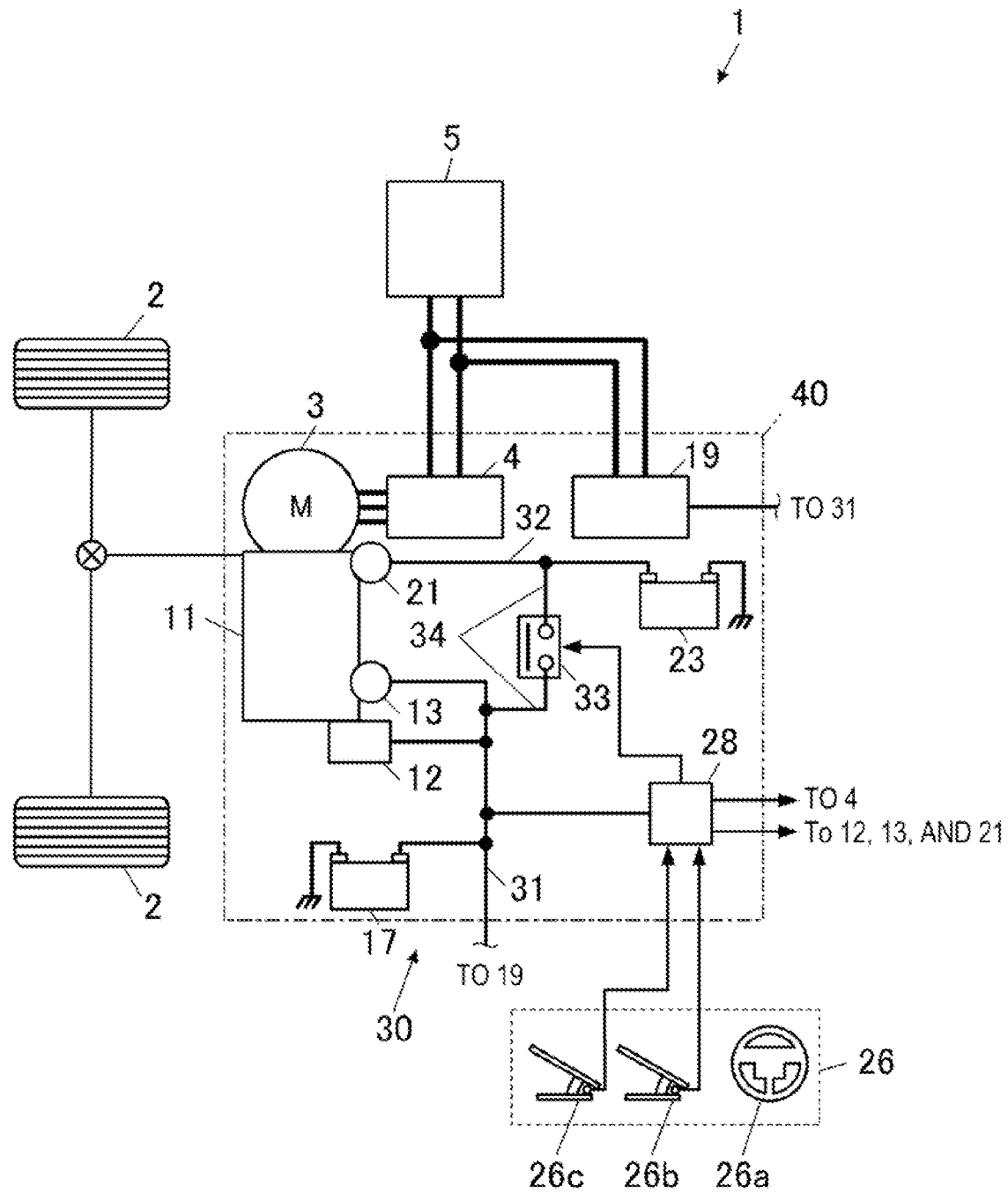
FIG. 1 is a block diagram illustrating a vehicle and a power supply device thereof according to an embodiment of the disclosure.

In a method of coping with freezing on a contact by applying heat, the contacts can be reactivated by melting the freezing. However, in such a method, a time lag may occur from when a request to switch the contact occurs to when the contact is made to function. In order to eliminate such a time lag, the freezing on the contact is to be suppressed from occurring.

Even in the method of coping with the freezing on the contact by applying heat, the freezing on the contact can be suppressed from occurring by continuing heating during a period of time in which the freezing is possible to occur. However, in this case, the electric power for the heating may be consumed for a long period of time.

It is desirable to provide a relay device in which freezing on a contact hardly occurs, and a power supply device of a vehicle in which a malfunction hardly occurs in a cold season.

An embodiment of the disclosure provides a relay device includes a first contact, a second contact, a first conductor, a second conductor, a housing, and a heat transfer member. The first contact and the second contact are switchable between a state of being close to each other and a state of being separated from each other. The first contact is electrically coupled at the first conductor. the second contact is electrically coupled at the second conductor. The housing accommodates the first contact, the second contact, the first conductor, and the second conductor. The heat transfer member is higher in thermal conductivity than the housing. The heat transfer member extends from outside the housing to inside the housing and is in contact with one or both of the first conductor and the second conductor.

An embodiment of the disclosure provides a power supply device for a vehicle. The vehicle includes a power source configured to generate power to drive the vehicle and a power source chamber in which the power source is disposed. The power supply device includes an electric power line and the above-described relay device. The relay device is configured to open and close an electric path of the electric power line. The relay device is disposed in the power source chamber.

In the vicinity of the relay device, a temperature of an external cable coupled to the relay device may drop significantly earlier than the ambient temperature of the relay device. In such a case, a large amount of heat is drawn from the relay device to the external cable, so that a temperature of the first contact or the second contact of the relay device significantly drops below a temperature of the air in the housing. Due to the difference between these temperatures, dew condensation may occur on the first contact or the second contact, and freezing may occur when the temperature of the first contact or the second contact further drops below the freezing point. On the other hand, according to the disclosure, heat is transferred between outside the housing and the first contact or the second contact via the heat transfer member and the first conductor or the second conductor, so that the temperatures can be balanced. Thus, even when the temperature of the external cable drops significantly earlier than the ambient temperature of the relay device, an occurrence of a large temperature difference between the first contact or the second contact and the air in the housing can be suppressed. Thus, the occurrence of the dew condensation on the first contact or the second contact is suppressed. With no dew condensation, freezing does not occur even below the freezing point. Thus, according to the disclosure, a relay device in which freezing hardly occurs on the first contact or the second contact can be provided. Furthermore, a power supply device of a vehicle in which a malfunction hardly occurs in a cold season can be provided by the relay device.

Embodiments of the disclosure will be described in detail below with reference to the drawings.

FIG. 1 is a block diagram illustrating a vehicle and a power supply device thereof according to the embodiment of the disclosure. As illustrated in FIG. 1, a vehicle 1 according to an embodiment of the disclosure includes drive wheels 2, a traction motor 3 that sends power to the drive wheels 2, an inverter 4 that drives the traction motor 3, a traction battery 5 that stores electric power to drive the vehicle 1, an engine 11 that is an internal combustion engine, a vehicle load (such as an electronically controlled injector) 12, a starter motor 13 that starts the engine 11, an auxiliary battery 17 that stores electric power for driving the vehicle load 12, a generator with motor function (for example, which may also be referred to as an integrated starter generator (ISG) or restart motor) 21 that generates electric power and outputs power for restarting the engine 11 after idling stop, and a restart battery 23 that stores electric power of the generator with motor function 21.

The auxiliary battery 17 and the restart battery 23 store and supply electric power at a voltage of a first voltage system (for example, a 12 V system). The traction battery 5 stores and supplies electric power at a voltage of a second voltage system (for example, a 100 V system or a 200 V system) higher than the first voltage system.

The vehicle 1 further includes a DC/DC converter 19 that can convert the voltage of the traction battery 5 into the voltage of the first voltage system and supply electric power to an electric power line 31 of the vehicle load 12. The auxiliary battery 17 may be charged with the electric power supplied from the DC/DC converter 19.

The vehicle 1 further includes a driving operator 26 operated by a driver who drives the vehicle 1, and a vehicle controller 28 that performs control for driving of the vehicle 1. The driving operator 26 includes a steering 26a, an accelerator operator 26b, and a brake operator 26c. Operation signals of the accelerator operator 26b and the brake operator 26c are sent to the vehicle controller 28. A configuration operated by an automatic driving system may be applied to the driving operator 26.

The vehicle controller 28 is one electronic control unit (ECU) or ECUs that communicate and cooperate with each other. The vehicle controller 28 performs driving control of the vehicle 1 based on an operation signal from the driving operator 26, control information sent from another ECU (not illustrated), and various information such as a vehicle state detected by a sensor (not illustrated). For example, the vehicle controller 28 controls the vehicle load 12, the starter motor 13, the inverter 4, the DC/DC converter 19, and the generator with motor function 21.

Power Supply Device of Vehicle

The power supply device 30 according to the embodiment of the disclosure includes the electric power line 31 that transmits electric power from the auxiliary battery 17 and the DC/DC converter 19 to the vehicle load 12, the starter motor 13, and the vehicle controller 28, and an electric power line 32 that transmits electric power between the generator with motor function 21 and the restart battery 23. Furthermore, the power supply device 30 includes electric power lines 34 interposed between the two electric power lines 31 and 32, and a relay device 33 that opens and closes an electric path of the electric power lines 34. The opening and closing of the relay device 33 are controlled by the vehicle controller 28 but may be controlled by another controller. The electric power lines 34 can transmit electric power between the restart battery 23, and the auxiliary battery 17 and the DC/DC converter 19.

The vehicle 1 includes a power source chamber 40 in which the power sources (the engine 11 and the traction motor 3) are disposed. The power source chamber 40 is a so-called engine room. The relay device 33 is disposed in the power source chamber 40. In the power source chamber 40, the air inside the power source chamber 40 becomes high in temperature when the engine 11 or the traction motor 3 is driven, while components that are likely to be low in temperature by receiving outside air are included. Alternatively, the power source chamber 40 includes components that are likely to be low in temperature by being coupled to the components receiving the outside air via a member having high thermal conductivity. The components that are likely to be low in temperature include the electric power lines 31, 32, and 34. The temperatures of these components may change significantly lower than the temperature of the air in the power source chamber 40 when the air is warm.

Figure 2A:
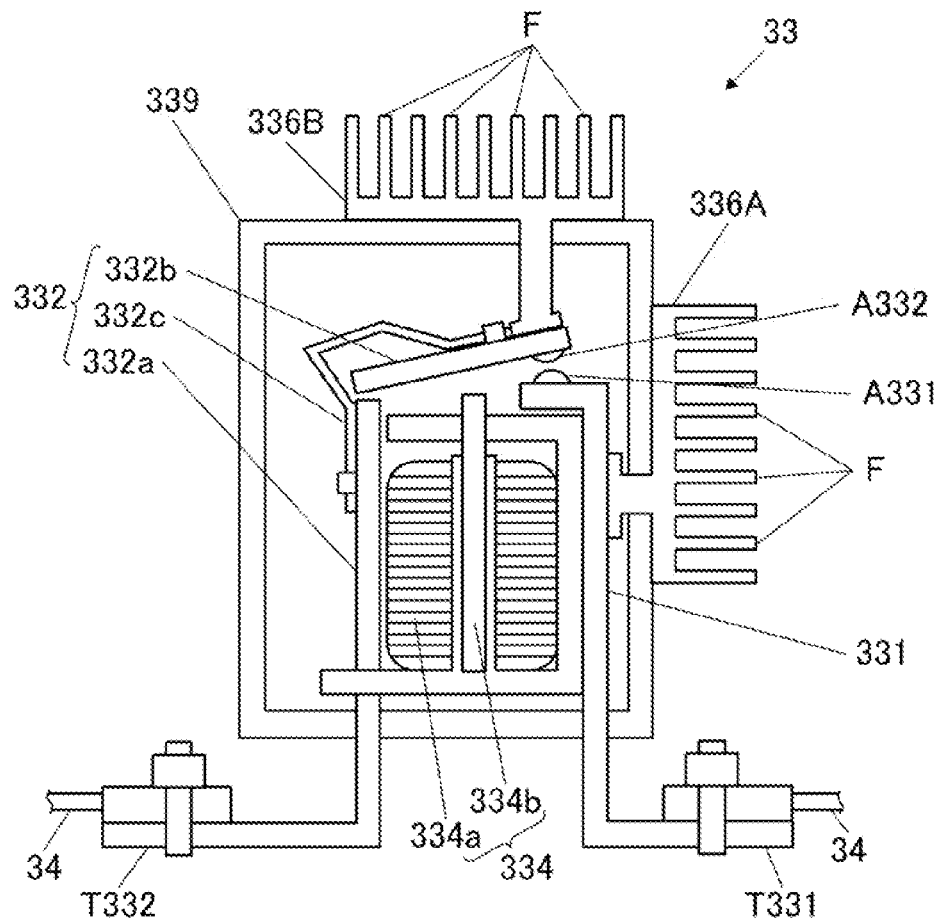
FIG. 2A is a configuration diagram illustrating a relay device in FIG. 1.
Figure 2B:
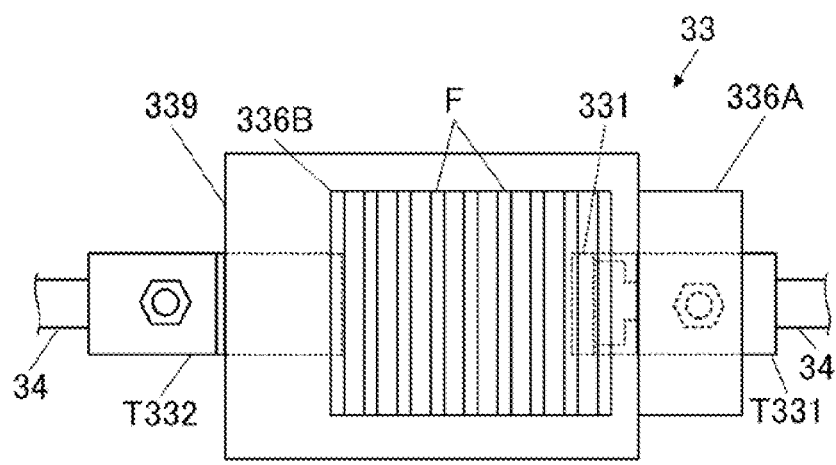
FIG. 2B is a configuration diagram of the relay device in FIG. 2A viewed from above.

FIG. 2A is a configuration diagram illustrating a relay device in FIG. 1. FIG. 2B is a configuration diagram of the relay device in FIG. 2A viewed from above. The relay device 33 includes a first contact A331 and a second contact A332 that are switchable between a state of being separated from each other and a state of being in contact with each other, a first terminal T331 to which one of the electric power lines 34 to be opened and closed is coupled and a second terminal T332 to which the other of the electric power lines 34 to be opened and closed is coupled, a first conductor 331 that electrically couples the first contact A331 with the first terminal T331, and a second conductor 332 that electrically couples the second contact A332 with the second terminal T332.

The relay device 33 further includes a driving mechanism 334 that brings the first contact A331 and the second contact A332 to be close to or separated from each other, and a housing 339. The housing 339 accommodates the first contact A331, the second contact A332, the first conductor 331, the second conductor 332, and the driving mechanism 334. The housing 339 may have a structure for sealing the inside.

The first conductor 331 is a conductor bar to which the first contact A331 is fixed and is fixed to the housing 339. The conductor bar is a plate-like or rod-like conductor having hardness not to be flexibly bend like a cable. The first conductor 331 may be permanently affixed to the first terminal T331.

The second conductor 332 includes a fixed conductor bar 332a fixed to the housing 339, a movable conductor bar 332b to which the second contact A332 is fixed, and a coupling conductor 332c that electrically couples the fixed conductor bar 332a with the movable conductor bar 332b. The movable conductor bar 332b is supported by a spring member and can be repositioned between a disposition in which the second contact A332 is close to the first contact A331 and a disposition in which the second contact A332 is separated from the first contact A331. The coupling conductor 332c may serve as the above-described spring member, or the coupling conductor 332c and the spring member may be provided separately. The fixed conductor bar 332a may be permanently affixed to the second terminal T332.

The first terminal T331 and the second terminal T332 are each coupled to the electric power line 34 in a coupling form (for example, bolt coupling) that allows a large current to flow. The electric power line 34 has a current capacitance that allows a large current to flow. In association with this configuration, the thermal conductivity resistance between the first terminal T331 and the electric power line 34, the thermal conductivity resistance between the second terminal T332 and the electric power line 34, the thermal conductivity resistance between the first terminal T331 and a member or a device beyond the electric power line 34, and the thermal conductivity resistance between the second terminal T332 and a member or a device beyond the electric power line 34 are reduced. Thus, when the electric power line 34 or the device or the member beyond the electric power line 34 is cooled, a large amount of heat is easily emitted from the first terminal T331 and the second terminal T332 via the electric power line 34.

The driving mechanism 334 includes a coil 334a and an iron core 334b and repositions the movable conductor bar 332b of the second conductor 332 by an action of electromagnetic force. A terminal (not illustrated) for supplying a current to the coil 334a is disposed outside the housing 339. The relay device 33 may be a latching relay that can maintain an open state and a closed state even when energization is stopped. In this case, the coil 334a may include a first system coil energized in switching from the open state to the closed state and a second system coil energized in switching from the closed state to the open state. In the case of the latching relay, a latching mechanism that can hold a position of the movable conductor bar 332b at two points is provided.

The relay device 33 further includes heat transfer members 336A and 336B extends from outside to inside the housing 339. The heat transfer members 336A and 336B are members higher in thermal conductivity than the housing 339 and may contain copper, aluminum, iron, or the like as a main component.

The heat transfer member 336A is in contact with the first conductor (conductor bar) 331 inside the housing 339 and balances the temperature of the first conductor 331 and the temperature of outside the housing 339. The first conductor 331 and the heat transfer member 336A may be brought into contact with each other by a form that achieves high thermal conductivity, such as the bolt coupling.

The heat transfer member 336B comes into contact with the movable conductor bar 332b inside the housing 339 and balances the temperature of the movable conductor bar 332b and the temperature of outside the housing 339. The heat transfer member 336B comes into contact with the movable conductor bar 332b when the second contact A332 is separated from the first contact A331. At this time, in order to achieve high thermal conductivity through a contact portion, the heat transfer member 336B may come into contact with the movable conductor bar 332b through a wide surface being the contact portion and may be applied a pressure from the movable conductor bar 332b by the spring member.

Each of the heat transfer members 336A and 336B includes fins F located outside the housing 339. The fins F promote heat exchange between the heat transfer member 336A and the air around the relay device 33 and between the heat transfer member 336B and the air around the relay device 33.

Each of the heat transfer members 336A and 336B may be covered with an insulating film. The heat transfer members 336A and 336B may contact the first conductor 331 and the second conductor 332, respectively, via insulating members having high thermal conductivity.

Action

In a cold season, the power source chamber 40 is in a severe temperature environment, such that the power source chamber 40 becomes high in temperature due to the driving of the power source, while the temperature may rapidly drop due to temporary stoppage of the power source, and the temperature may drop below the freezing point due to long stoppage of the power source. Thus, in the relay device 33 subjected to such a temperature environment, even when an internal space of the relay device 33 is sealed by the housing 339, moisture may enter the inside the relay device 33 over time.

When the moisture enters the inside the relay device 33, the moisture in the relay device 33 is vaporized by the temperature of the relay device 33 becoming high. Thereafter, when the electric power line 34 becomes low in temperature first and a large amount of heat is absorbed from the first terminal T331 and the second terminal T332 to the electric power line 34, the temperature of each of the first conductor 331 and the second conductor 332 drops earlier than the temperature of the air in the housing 339. If this temperature drop reaches the first contact A331 and the second contact A332, dew condensation occurs on the first contact A331 and the second contact A332. In the present embodiment; however, heat is transferred between the air in the power source chamber 40 and the first conductor 331 via the heat transfer member 336A and also between the air in the power source chamber 40 and the second conductor 332 via the heat transfer member 336B. Thus, the temperature of each of the first contact A331 and the second contact A332 is suppressed from significantly dropping below the temperature of the air in the housing 339. Thus, the occurrence of the dew condensation on each of the first contact A331 and the second contact A332 can be suppressed.

For example, in the present embodiment, the heat transfer members 336A and 336B contact the first conductor (conductor bar) 331 to which the first contact A331 is fixed and the movable conductor bar 332b to which the second contact A332 is fixed, respectively. That is, the heat transfer members 336A and 336B are coupled to the first contact A331 and the second contact A332, respectively, in a thermally conductive manner without interposing a large thermal resistance. Thus, the temperature of each of the first contact A331 and the second contact A332 can be further suppressed from dropping significantly below the temperature of the air in the housing 339, and the occurrence of the dew condensation on each of the first contact A331 and the second contact A332 can be further suppressed.

In a situation where moisture in the relay device 33 vaporizes, the temperature of the air in the power source chamber 40 is often higher than the temperature of the air in the housing 339. In the present embodiment, each of the heat transfer members 336A and 336B includes the fins F outside the housing 339. Thus, the fins F of each of the heat transfer members 336A and 336B is exposed to the air in high temperature, so that the temperature of each of the first conductor 331 and the second conductor 332 can be further suppressed from significantly dropping below the temperature of the air in the housing 339.

As described above, the dew condensation on each of the first contact A331 and the second contact A332 is less likely to occur, and thus the occurrence of the freezing on each of the first contact A331 and the second contact A332 is suppressed. Thus, even in a cold season in which the outside air is below the freezing point, the freezing on each of the first contact A331 and the second contact A332 can be suppressed from occurring in many situations.

In a situation where the temperature of the entire power source chamber 40 drops due to the temporary stoppage or the long stoppage of the power source, the temperature of each of the first conductor 331 and the second conductor 332 also drops. In such a situation; however, the temperature of the air inside the housing 339 also drops. Thus, occurrence of concentrated dew condensation on each of the first contact A331 and the second contact A332 is suppressed. Thus, even when the temperature of the power source chamber 40 becomes below the freezing point, the freezing is less likely to occur on each of the first contact A331 and the second contact A332. Thus, even in a cold season in which the outside air is below the freezing point, the freezing on each of the first contact A331 and the second contact A332 can be suppressed from occurring in many situations.

As described above, according to the relay device 33 of the present embodiment, the temperature of outside the housing 339 and the temperature of each of the first conductor 331 and second conductor 332 are balanced by the heat transfer members 336A and 336B.

Thus, as described above, the relay device 33 in which the freezing hardly occurs on each of the first contact A331 and the second contact A332 can be provided. If a method of coping with the freezing on the contact by heating is employed to suppress the freezing on the contact from occurring, continuous heating is to be performed during a period of time in which the freezing is possible to occur, and complicated control such as determining the period of time in which the freezing is possible to occur is to be performed. In the present embodiment; however, power consumption and complicated control performed to suppress the freezing on the contact can be reduced (for example, can be eliminated).

In the present embodiment, the example has been described in which the two heat transfer members 336A and 336B contact the first conductor 331 and the second conductor 332, respectively. However, the heat transfer members may not necessarily contact both the first conductor 331 and the second conductor 332. For example, one of the first conductor 331 and the second conductor 332 may be likely to be low in temperature, such as a case where an electric power line 34 coupled to one of the first conductor 331 and the second conductor 332 has a structure less likely to be low in temperature. In such a case, the heat transfer member (336A or 336B) may be brought into contact with the conductor (331 or 332) that is likely to be low in temperature.

According to the relay device 33 of the present embodiment, each of the heat transfer members 336A and 336B includes the fins F disposed outside the housing 339. Thus, the temperature of the air outside the housing 339 and the temperature of each of the first conductor 331 and the second conductor 332 can be balanced by heat transfer by the heat transfer members 336A and 336B. Thus, in an environment such as the power source chamber 40 in which the temperature inside is likely to be maintained high, the temperature drop of each of the first conductor 331 and the second conductor 332 can be further suppressed.

Each of the heat transfer members 336A and 336B may not include the fins F but may spread outside the housing 339 in a planar shape. In the present embodiment, the example has been described in which each of the heat transfer members 336A and 336B exchanges heat mainly with the air outside the housing 339. However, when an object whose temperature is less likely to drop is present outside the housing 339, the heat transfer member may be brought into contact with the object.

According to the relay device 33 of the present embodiment, the heat transfer member 336A is in contact with the conductor bar (first conductor 331) to which the first contact A331 is fixed. Thus, the thermal resistance between the heat transfer member 336A and the first contact A331 is reduced, and the temperature drop of the first contact A331 can be further suppressed. The heat transfer member 336A is in contact with the fixed first conductor 331, and thus the heat transfer member 336A and the first conductor 331 can be coupled to each other with high thermal conductivity.

According to the relay device 33 of the present embodiment, the heat transfer member 336B comes into contact with the movable conductor bar 332b to which the second contact A332 is fixed. Thus, the thermal resistance between the heat transfer member 336B and the second contact A332 is reduced, and the temperature drop of the second contact A332 can be further suppressed. The heat transfer member 336B comes into contact with the movable conductor bar 332b when the second contact A332 is separated from the first contact A331. Thus, a coupling structure between the heat transfer member 336B and the movable conductor bar 332b can be easily implemented.

According to the power supply device 30 of the vehicle 1 of the present embodiment, the relay device 33 is disposed in the power source chamber 40. In the power source chamber 40, a component whose temperature is likely to drop as compared with the temperature of the air in the power source chamber 40 is disposed. When the component and the terminal of the relay device 33 are coupled to each other in a thermally conductive manner, the dew condensation and the freezing may occur on the contact of the relay device 33. For example, the relay device 33 that opens and closes the electric path of the electric power lines 34 between the auxiliary battery 17 and the restart battery 23 is disposed close to the engine 11, and thus the dew condensation and the freezing may occur as described above. Application of the relay device 33 according to the present embodiment; however, even in the above-described situation, allows the power supply device 30 of the vehicle 1 in which the dew condensation and the freezing on the contact are suppressed and the malfunction is less likely to occur in a cold season to be provided.

The embodiment of the disclosure has been described above. However, the disclosure is not limited to the above embodiment. For example, in the above-described embodiment, the example has been described in which the relay device 33 is coupled to open and close the electric path between the auxiliary battery 17 and the restart battery 23. However, the location to which the relay device 33 is coupled is not limited to the location described above. For example, the relay device 33 may be coupled between the auxiliary battery 17 and electrical equipment (the vehicle load 12 or other devices) or may be coupled to an electric path of an electric power line of the traction battery 5. The vehicle 1 on which the relay device 33 is to be mounted is not limited to a hybrid electric vehicle (HEV) as the vehicle 1 of the above-described embodiment and may be an engine vehicle or an electric vehicle (EV).

In the above-described embodiment, the example has been described in which the relay device 33 is to be mounted on the power supply device 30 of the vehicle; however, the relay device according to the disclosure may be mounted on various devices such as an industrial machine, for example. When a severe temperature environment occurs in a place in the devices, an effect similar to that of the present embodiment can be obtained by applying the relay device according to the disclosure as a relay disposed in the place. In addition, details described in the embodiments can be appropriately changed without departing from the gist of the disclosure.

The invention claimed is:

1. A relay device comprising:
a first contact and a second contact that are switchable between a state of being close to each other and a state of being separated from each other;
a first conductor where the first contact is electrically coupled;
a second conductor where the second contact is electrically coupled;
a housing accommodating the first contact, the second contact, the first conductor, and the second conductor; and
a heat transfer member being higher in thermal conductivity than the housing,
wherein the heat transfer member extends from outside the housing to inside the housing and is in contact with one or both of the first conductor and the second conductor, and
wherein the heat transfer member directly contacts one or both of the first conductor and the second conductor.

2. The relay device according to claim 1, wherein the heat transfer member comprises a fin disposed outside the housing.

3. The relay device according to claim 1, wherein the first conductor comprises a conductor bar where the first contact is fixed, and
wherein the heat transfer member is in contact with the conductor bar.

4. The relay device according to claim 1, wherein the second conductor comprises a movable conductor bar where the second contact is fixed, and
wherein the heat transfer member is configured to come into contact with the movable conductor bar when the second contact is separated from the first contact.

5. A power supply device for a vehicle, the vehicle comprising a power source configured to generate power to drive the vehicle and a power source chamber where the power source is disposed, the power supply device comprising:
an electric power line; and
the relay device according to claim 1, the relay device being configured to open and close an electric path of the electric power line,
wherein the relay device is disposed in the power source chamber.

6. The relay device according to claim 1, wherein the heat transfer member is in contact with the first conductor inside the housing and balances a temperature of the first conductor and a temperature of outside the housing.

7. The relay device according to claim 1, wherein the heat transfer member is brought into contact with the first conductor inside the housing by bolt coupling.

8. The relay device according to claim 1, wherein the heat transfer member is in contact with the second conductor inside the housing and balances a temperature of the second conductor and a temperature of outside the housing.

9. The relay device according to claim 1, wherein the heat transfer member is brought into contact with the second conductor inside the housing by bolt coupling.

10. The relay device according to claim 1, wherein the heat transfer member is an integral structure.

11. The relay device according to claim 1, wherein a surface of the heat transfer member is in direct contact with one or both of the first conductor and the second conductor.

12. The relay device according to claim 1, wherein the heat transfer member includes an angled surface.

13. The relay device according to claim 1, wherein the second conductor comprises a movable conductor bar where the second contact is fixed,
wherein the movable conductor bar is configured to move within the housing between (i) a first position where the second contact contacts the first contact and (ii) a second position where the second contact is separated from the first contact,
wherein the heat transfer member is separated from the movable conductor bar when the movable conductor bar is in the first position, and
wherein the heat transfer member is in direct contact with the movable conductor bar when the movable conductor bar is in the second position.

14. The relay device according to claim 13, further comprising a spring that presses the movable conductor bar in the second position toward the heat transfer member.

15. The relay device according to claim 1, wherein the heat transfer member comprises a first heat transfer member and a second heat transfer member separated from the first heat transfer member,
wherein the first conductor comprises a fixed conductor bar where the first contact is fixed,
wherein the fixed conductor bar is fixed inside the housing,
wherein the first heat transfer member is in direct contact with the first conductor bar,
wherein the second conductor comprises a movable conductor bar where the second contact is fixed,
wherein the movable conductor bar is configured to move within the housing between (i) a first position where the second contact contacts the first contact and (ii) a second position where the second contact is separated from the first contact,
wherein the second heat transfer member is separated from the movable conductor bar when the movable conductor bar is in the first position, and
wherein the second heat transfer member is in direct contact with the movable conductor bar when the movable conductor bar is in the second position.

16. The relay device according to claim 15, further comprising a spring that presses the movable conductor bar in the second position toward the second heat transfer member.

17. The relay device according to claim 16, further comprising a first terminal disposed outside the housing and a second terminal disposed outside the housing,
wherein the first conductor electrically couples the first contact and the first terminal, wherein the second conductor electrically couples the second contact and the second terminal,
wherein the second conductor comprises the spring, and
wherein the spring electrically couples the second contact and the second terminal.

18. The relay device according to claim 1, wherein the heat transfer member comprises an electrical insulating film disposed on a surface of the heat transfer member in contact with one or both of the first conductor and the second conductor.

19. A relay device comprising:
a first contact and a second contact that are switchable between a state of being close to each other and a state of being separated from each other;
a first conductor where the first contact is electrically coupled;
a second conductor where the second contact is electrically coupled;

a housing accommodating the first contact, the second contact, the first conductor, and the second conductor; and a heat transfer member being higher in thermal conductivity than the housing, wherein the heat transfer member extends from outside the housing to inside the housing and is in contact with one or both of the first conductor and the second conductor, and wherein the housing includes an opening that the heat transfer member extends through the opening to inside the housing.

20. A relay device comprising:

a first contact and a second contact that are switchable between a state of being close to each other and a state of being separated from each other;

a first conductor where the first contact is electrically coupled;

a second conductor where the second contact is electrically coupled;

a housing accommodating the first contact, the second contact, the first conductor, and the second conductor;

a first heat transfer member being higher in thermal conductivity than the housing; and a second heat transfer member being higher in thermal conductivity than the housing, wherein the first heat transfer member extends from outside the housing to inside the housing and is in contact with the first conductor, and wherein the second heat transfer member extends from outside the housing to inside the housing and is in contact with the second conductor.

* * * * *